(12) United States Patent
Christensen (10) Patent No.: US 8,066,248 B2
(45) Date of Patent: Nov. 29, 2011

(54) MOUNTING DEVICE

(75) Inventor: Martin Christensen, Tinglev (DK)

(73) Assignee: Martech Holding A/S, Tinglev (DK)

( * ) Notice: Subject to any disclaimer, the term of this patent is extended or adjusted under 35 U.S.C. 154(b) by 261 days.

(21) Appl. No.: 12/310,346

(22) PCT Filed: Aug. 23, 2007

(86) PCT No.: PCT/DK2007/000382
§ 371 (c)(1),
(2), (4) Date: Jul. 13, 2009

(87) PCT Pub. No.: WO2008/022641
PCT Pub. Date: Feb. 28, 2008

(65) Prior Publication Data
US 2010/0001546 A1    Jan. 7, 2010

(30) Foreign Application Priority Data

Aug. 23, 2006 (EP) .................................... 06388056

(51) Int. Cl.
*F16M 13/00* (2006.01)
(52) U.S. Cl. ...................................................... 248/429
(58) Field of Classification Search .................. 248/419, 248/429, 424, 503, 503.1; 296/65.13, 65.03, 296/65.15
See application file for complete search history.

(56) References Cited

U.S. PATENT DOCUMENTS

| 6,637,712 | B1 * | 10/2003 | Lagerweij ...................... 248/429 |
| 6,764,054 | B2 * | 7/2004 | Becker et al. .................. 248/429 |
| 6,902,365 | B1 * | 6/2005 | Dowty ........................... 410/105 |
| 7,207,541 | B2 * | 4/2007 | Frohnhaus et al. ............ 248/429 |
| 7,506,856 | B2 * | 3/2009 | Ikegaya et al. ................ 248/430 |
| 2011/0073742 | A1 * | 3/2011 | Marechal .................... 248/503.1 |

FOREIGN PATENT DOCUMENTS

| DE | 19520959 A1 | 12/1996 |
| DE | 19851392 A1 | 5/1999 |
| DE | 20019891 U1 | 5/2001 |
| EP | 0922605 A2 | 6/1999 |
| GB | 2219493 A | 12/1989 |

* cited by examiner

*Primary Examiner* — Ramon Ramirez
(74) *Attorney, Agent, or Firm* — Day Pitney LLP (57) ABSTRACT

The present invention concerns a mounting device for fastening a chair or seat to a groove (41), said groove comprising engagement means (45), where the mounting device comprises locking means (20) prepared for entering the groove and for being moved along the longitudinal axis of the groove; said locking means having means (23) for engaging with the engagement means (45) of the groove. The mounting device further comprises positioning means (30) for finding a position of the mounting device where the locking means will be able to engage with the engagement means of the groove. The mounting device comprises a first cam (22) for controlling the engagement and disengagement of the locking means with said engagement means; a second cam (32) for switching the positioning means into an active position, where the positioning means extend into the groove in selected parts (46) thereof, and one shaft (5) for rotating both the first and the second cam. The invention also concerns a method for mounting a mounting device according to the invention.

16 Claims, 6 Drawing Sheets

MOUNTING DEVICE

The present invention concerns a mounting device for fastening a chair or seat to a groove, said groove comprising engagement means, where the mounting device comprises locking means prepared for entering the groove and for being moved along the longitudinal axis of the groove; said locking means having means for engaging with the engagement means of the groove. The mounting device further comprises positioning means for finding a position of the mounting device where the locking means will be able to engage with the engagement means of the groove. The invention also concerns a method for mounting a mounting device according to the invention.

Mounting devices of this type is known for fastening chairs or seats especially when such mounting is performed to the floor in vehicles such as buses. In a known solution the positioning means is activated after the locking means of the mounting device has been placed inside the groove in the floor. When the positioning means is active, the mounting device may be moved along the direction of the groove with the locking means inside the groove, and the positioning means sliding on top of the groove. When the mounting device arrives at a position where the locking means will be able to engage with the engagement means of the groove, the positioning means must fit into an opening in the groove and it will be pushed into this opening, e.g. by means of a spring force.

This means that the shape of the positioning means and the shape of the groove in the surface to which mounting is to take place must fit together in such a way that the positioning means will only enter into the groove when the position of the locking means of the mounting device is such that these can engage with the engagement means of the groove. Following the entering of the positioning means into the groove, the locking means may be brought into engagement with the engagement means, such that the position of the mounting device is fixated in the groove.

The strength and reliability of this fixation is obviously very important when the mounting device is used for fixation of seats in a vehicle, since the safety of persons being transported In the vehicle is depending on this fixation.

In order to ensure a correct mounting of e.g. seats, it is necessary to be able to operate the mounting device in three different modes.

In a first mode it is possible to place the locking means in the groove and move the mounting device freely along the longitudinal axis of the groove. The positioning means should not be an obstacle to this movement, and therefore, the positioning means should be passive in this mode. By passive is meant that the positioning means is held back so that there is no force trying to push the positioning means into the grove.

In a second mode the positioning means is active so that there is a force pushing the positioning means against the open part of the groove. When the positioning means is placed in a position where the shape of the positioning means fits into the opening of the groove the positioning means will be pushed into the groove and keep the mounting device in this position and prevent further movement.

In the third mode the locking means are being locked by forcing these against the engagement means of the groove. The third mode should only be entered after the positioning means in mode two have entered the groove and is keeping the mounting device in the position where the locking means will be able to engage with the engagement means of the groove.

The problem of the known mounting devices is that shifting between these three modes is not straight forward. The handle has to be operated in different ways, i.e. both rotation and pushing/pulling of the handle is necessary. This will in itself Increase the Installation time of e.g. seats in a bus. At the same time this also means that there Is no simple way of setting up a system for shifting the modes of two or more mounting devices in parallel grooves simultaneously. The lack of such a system will also increase installation time. Furthermore, the simpler the installation of e.g. seats is, the more reliable installation will be achieved The transmission of a rotational movement from rotation of the handle to the translational movement of the positioning means and to the locking means must be as simple, stable and reliable as possible. The transmission mechanism should be as compact as possible.

The installation time Is an important parameter, since the number of seats in a bus may be significant. Furthermore, there may be buses which are applied for varies purposes where the seats are removed or moved around frequently. This could be a bus where it sometimes needs to be filled with seats and sometimes tables or extra space is needed between the seats.

The object of the invention has therefore been to develop a mounting device where shifting between the three modes are simple and fast. Furthermore, it is an object of the invention to obtain a mounting device where shifting between the three modes for two or more mounting devices simultaneously can be set up in a simple way.

This problem is solved by a mounting device comprising a first cam for controlling the engagement and disengagement of the locking means with said engagement means; a second cam for switching the positioning means into an active position, where the positioning means extend into the groove in selected parts thereof; and one shaft for rotating both the first and the second cam, said shaft being, by a rotational movement, able to adjust the mounting device between at least three modes:

1) the positioning means is passive and the locking means are disengaged,
2) the positioning means is active and the locking means are disengaged,
3) the locking means are engaged with the engagement means.

Such a mounting device will have the advantages of being both simple and reliable in operation.

The use of a first and a second cam facilitate a very simple and stable direct transmission of the rotational movements of the handle into a translational movement of the engagement means and the positioning means. This clearly distinguish the present invention from e.g. DE 198 51 392 A1. The mechanism of the present invention can also be made more compact than the solution in DE 198 51 392 A1.

In a preferred embodiment the mounting device is having means for preventing rotation of the shaft into the third mode before the position means in the second mode has found a position where the locking means may engage with the engagement means of the groove, thus preventing defective fastening of the mounting device if the locking means are in the wrong position.

In a preferred embodiment the one shaft for rotating the two cams is substantially parallel with the plane formed by the surface comprising the groove. This facilitates easy installation and makes it possible to operate more than one mounting device simultaneously by dimensioning the shaft accordingly. This gives the opportunity of providing a system for mounting furniture to the floor of a vehicle comprising two mounting devises. This involves the advantage that the user may secure or release a seat on e.g. two frames in one operation using a single handle. This handle rotates a shaft extending through two mounting devices and controls the positions of the cams in both mounting devices.

In a preferred embodiment the positioning means is prepared for extending into the groove in areas between the positions of engagement means along the longitudinal direction of the groove. This offers a relatively precise positioning of the mounting device.

In a further embodiment the locking means is corresponding with a first framework transferring the rotational movement of the first cam to a movement of the locking means substantially perpendicular to the surface comprising said groove. This is a reliable and simple way of moving the locking means.

In a further embodiment the positioning means is corresponding with a second framework transferring the rotational movement of the second cam to a movement of the positioning means substantially perpendicular to the surface comprising said groove. This is also a reliable and simple way of moving the positioning means.

Preferably, the rotational positions of the cams are transferred directly the frameworks being in direct engagement with the locking means and positioning means, respectively.

In a preferred embodiment the second framework is placed to move through an opening in said first framework, offering a mechanical more stable construction.

In a further embodiment the mounting device is prepared for being mounted in a groove wherein the areas (for entrance of either the locking means or the positioning means) along the longitudinal direction of the groove are formed by parts of circle peripheries, situated symmetrically opposite one another on both sides of the groove. Preferably, engagement means are formed in the positions where two parts of circle peripheries adjoins. This offers a flexible system where mounting into the groove is relatively fast. Preferably, the two parts of circle peripheries situated symmetrically opposite one another, forms part of the periphery of substantially the same circle having its center in the center of the area.

In a further embodiment the mounting device is designed to be placed directly on the bottom surface of the groove. Thereby, all loads on the mounting device will be transferred to the floor construction.

In a preferred embodiment the invention also concerns a seat for mounting to the floor of a vehicle by means of the mounting device according to any one of the previous claims. Preferably, two mounting devices will be applied for a seat or for a set of seats.

In a further embodiment the invention also concerns a method for mounting a mounting device according to any one of the claims 1-12 wherein the mounting device is secured in a groove with engagement means, comprising the steps of a) entering the locking means into the groove; b) activating the positioning means by the handle such that a force will act on the positioning means in order to push it into the groove when the geometry of the positioning means fits the geometry of the groove; c) when the mounting device is in a position where the locking means will be able to engage with the engagement means of the groove, the handle is set in a position pressing the locking means against the engagement means. Furthermore, the handle is shifted between the three modes of operation by rotating a shaft giving the position of a first cam controlling the position of the locking means and simultaneously giving the position of a second cam controlling the position of the positioning means.

The invention is now described in further detail with reference to the drawings.

Figure 1:
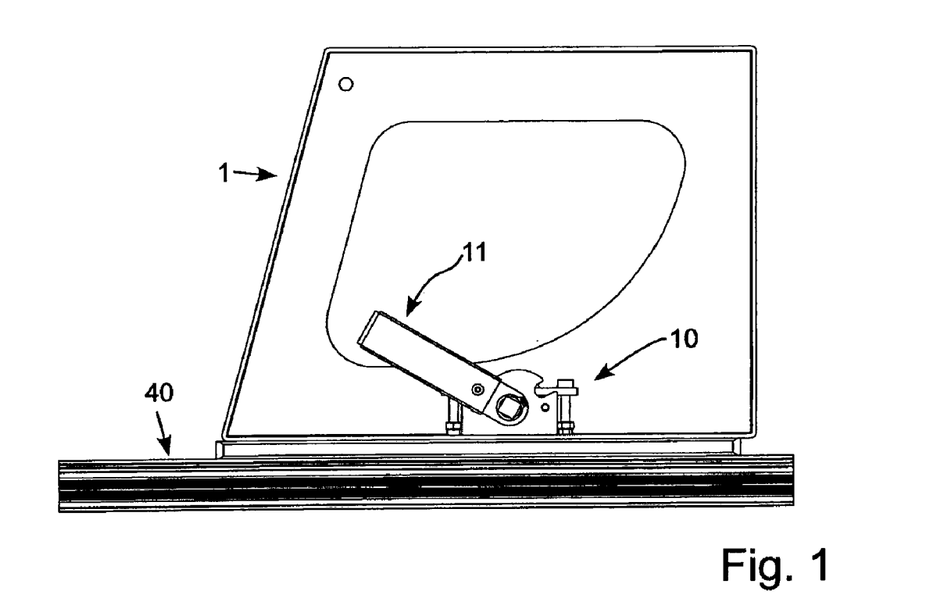
FIG. 1 illustrates a frame for holding a chair seat. The frame comprises a mounting device according to the invention.

In FIG. 1 a frame 1 for holding a chair is shown. Often two opposed frames will be applied for each chair. The frame is secured to a profiled floor 2 comprising one or more grooves, by a mounting device 10 of the invention. Often the frame 1 will be equipped with fittings for securing e.g. the chair or the seat (not shown).

Figure 2:
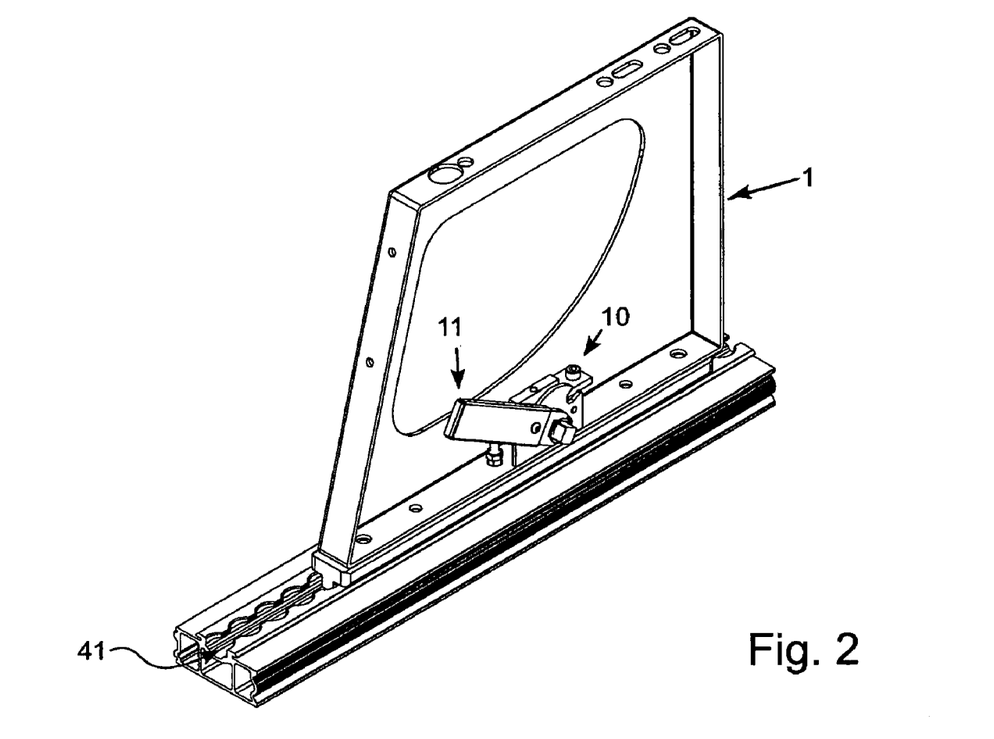
FIG. 2 illustrates the frame of FIG. 1 in a perspective view.

In FIG. 2 the frame of FIG. 1 is viewed in perspective. The mounting device 10 including the handle 11 for selecting mode of operation is also illustrated. The profiles 40 making up the floor into which the mounting device is fastened is shown. Furthermore, the groove 41 into which the mounting device 10 is fastened, is illustrated.

Figure 3:
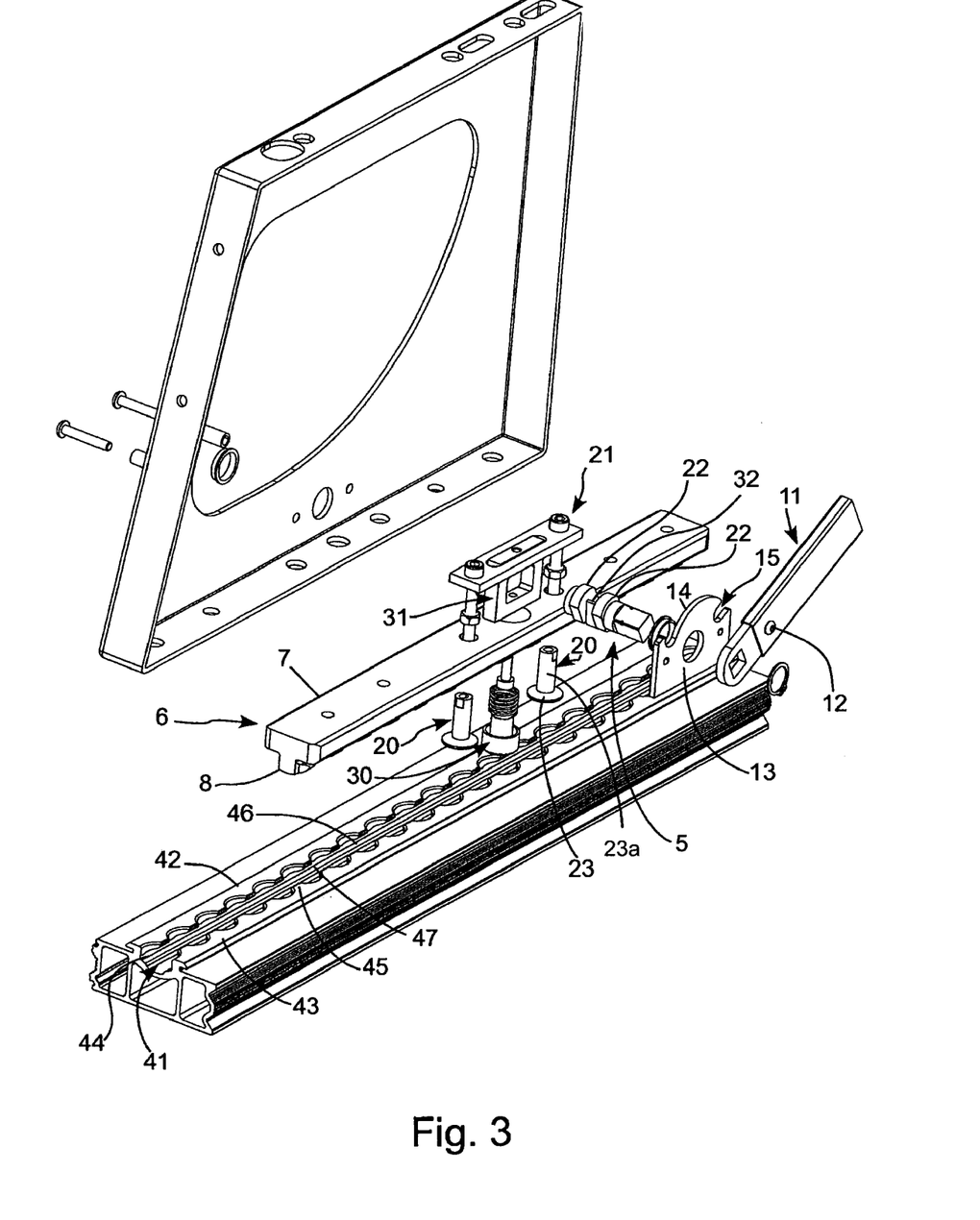
FIG. 3 illustrates an exploded view of the mounting device according to the invention. Also the profile with a groove into which the mounting device is attached is illustrated.

FIG. 3 illustrates an example of a profile 40 to which the frame 1 is attached using the mounting device 10 of the invention. Usually, the floor in a vehicle would be made by connecting a number of such profiles 40 being attached to e.g. the carrying structure of the vehicle, e.g. by an adhesive. The profile 40 comprises a groove 41 into which the mounting device 10 is secured. This groove 41 is limited by a first upper surface portion 42 extending along the longitudinal direction of the groove 41 on one side of the groove, and by a second surface portion 43 extending along the longitudinal direction of the groove 41 on the opposite side of the groove 41. The groove is also limited by sidewalls 44. The surface portion has a design such that the distance across the groove 41 between the first surface portion 42 and the second surface portion 43 alternately is relatively smaller and larger. Thereby engagement means 45 for engaging with locking means (to be described below) is formed at positions with relatively little distance between the two surface portions 42 and 43.

The design of the first 42 and the second surface portion 43 could be a continuous pattern of equidistant half circles, or smaller fractions of the circumference of a circle. The engagement means 45 would then be formed between these parts of a circle periphery (hereafter referred to as half circles). The circular area between two half circles 46 will then offer sufficient space for entering the locking means 20 into the groove 41. Furthermore, this area 46 will also be used by positioning means 30 (to be described below). When the mounting device 10 on the frame 1 is in a second mode of operation it may be moved slightly along the longitudinal axis of the groove 41, until it reaches a position where the positioning means 30 of the mounting device 10 will be pushed through the area 46, e.g. formed by two half circles, and thereby fixing the position of the mounting device 10 and prevent further movement.

FIG. 3 gives an exploded view of the mounting device 10 with the frame 1 and the profile 40 (described above). The mounting device is attached to supporting means 6, comprising a base part 7 for being placed on the top surfaces 42 and 43 surrounding the groove 41 and an entering part 8 for entering the groove 41. The frame 1 is secured to the base part 7 of the supporting means 6.

The mounting device 10 will now be described in further details. A handle 11 controls the mode of operation of the mounting device 10 by rotation of a shaft 5 to which a first cam 22 (or set of cams as shown) and a second cam 32 is attached, displaced along the length of the shaft 5 in relation to the first cam 22. The first cam 22 is sliding against a first framework 21, to which locking means 20 are attached. The locking means 20 extends through the supporting means 6. The second cam 32 is sliding against the second framework 31, to which positioning means is attached. A spring 35 will also influence the position of the positioning means 30. The spring 35 acts on a portion of the positioning means 20 on the one hand, and on a flange portion (not shown) of the supporting means 6 on the other hand, such as to bias the positioning means, and hence the framework 31, in a downward direction. The second framework 31 is movable within the first framework 21 through an opening in the first framework. This provides a very compact and stable construction.

When in use the first cam 22 will be adjusting the position of the locking means 20 by sliding against the first framework 21 rotating the shaft 5. Thereby, the rotational position of the first cam 22 will control the position of locking means 20 attached to the framework 21. This position is controllable in a direction perpendicular to the floor 2. The same handle 11 also controls the position of the positioning means 30 attached to the second framework 31, the position of which is controllable by rotation of the shaft 5. The second cam 30 thus adjusts the position of the positioning means 30 by moving the second framework 31 in a direction perpendicular to the floor 2.

As illustrated in FIG. 3 a locking means 20 will typically comprise two parts 23, 23a. If the locking means 20 are rotationally-symmetrical as illustrated the lower holding part 23 will have a larger diameter than the upper part 23a. The diameter of the lower part 23 must be such that the lower part is able to pass through the area 46 for entrance into the groove 41. The lower part 23 must also be large enough to engage with the engagement means 45 when the locking means 20 is placed with the holding part 23 in the groove 41 between a set of engagement means 45, i.e. the diameter of the holding part 23 must be larger than the distance between the two oppositely placed engagement means 45.

The upper part 23a of the locking means must have a diameter smaller than the distance between the two oppositely placed engagement means 45, in order for the locking means 20 to be freely moveable along the longitudinal direction of the groove 41.

The shaft 5 could easily be lengthened in order to simultaneously control by the same handle 11 a first and a second cam of one or more parallel mounting devices on further frames. This involves the advantage that the user may secure or release a seat on frame 1 in one operation using a single handle.

Figures 4, 5:
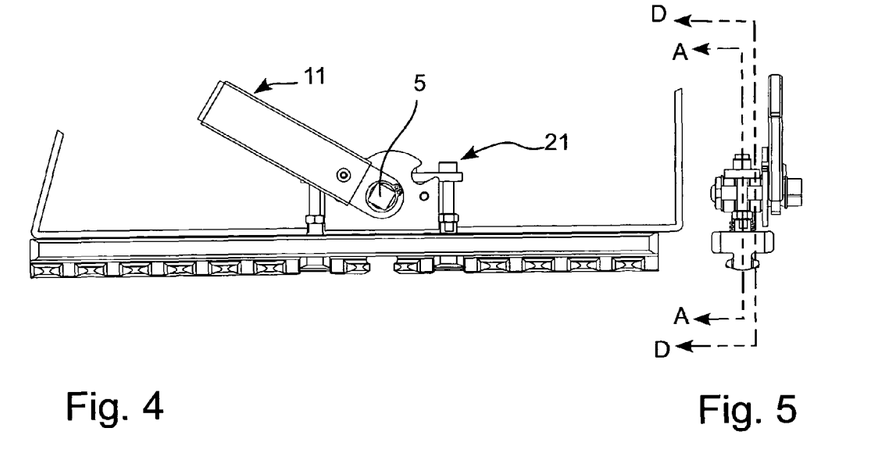
FIG. 4 illustrates the mounting device according to the invention in a first mode.
FIG. 5 illustrates a view of the mounting device of FIG. 4 rotated 90 degrees.

FIG. 4 illustrates a mounting device 10 according to the invention. The handle 11 is set in a position such that the mounting device is operating in a first mode.

FIG. 5 illustrates the mounting device 10 in a 90 degree rotated view compared to FIG. 4. Two different sectional views are indicated in FIG. 5 and shown in FIGS. 6 and 7 in order to illustrate the position of the first and the second cam 22 and 32 in a first mode of operation. One view, D-D, pass through the first cam 22, and another view A-A pass through the second cam 32.

Figure 6:
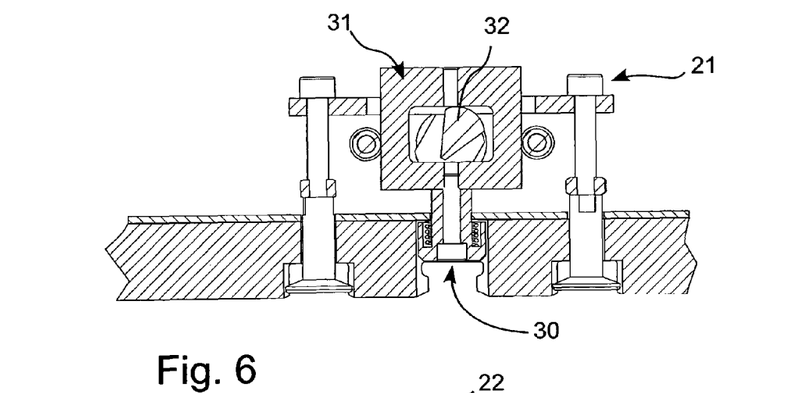
FIG. 6 illustrates the cross sectional view A-A of the mounting device in a first mode.
Figure 7:
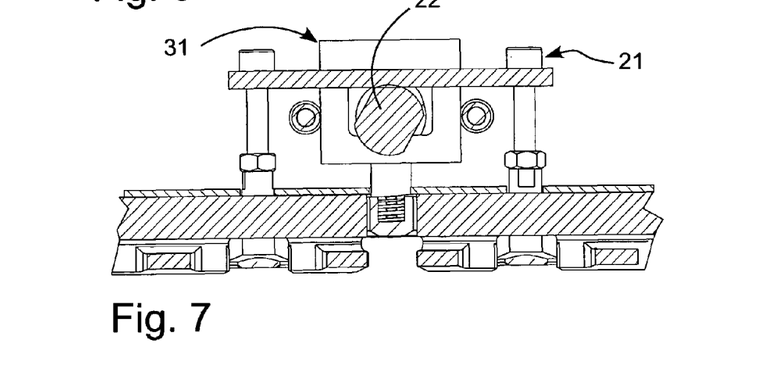
FIG. 7 illustrates the cross sectional view D-D of the mounting device in a first mode.

FIGS. 6 and 7 gives a closer view of the mounting device 10 in the first mode. The handle 11 controls the rotational position of the first cam 22 (see FIG. 7) and of the second cam 32 (see FIG. 6). The first and the second cams 22 and 32 are both fixed to the same shaft 5, and the handle 11 is arranged for rotating this shaft. The first cam 22 is interacting with the framework 21 to which the locking means 20 is attached. The second cam 32 is interacting with the framework 31 to which the positioning means 30 is attached. The two frameworks 21 and 31 may be any mechanical means suitable for transferring the position of the cams (22 and 32) to the vertical position of the locking means 20 and the positioning means 30, respectively.

The sectional view A-A in FIG. 6 illustrates that in the first mode the second cam 32 will be in a position where the positioning means 30 are passive by the cam 32 raising framework 31 with positioning means 30, i.e. the positioning means 30 are held in a fixed position such that it will not be able to enter the area 46 when the mounting device 1 is moved along the groove 41. As explained above, in this position the spring 35 will be compressed between the head portion of the positioning means 30 and a flange part of the supporting means 6 (not shown).

The sectional view D-D in FIG. 7 illustrates that in the first mode the first cam 22 is in a position such that the locking means 20 will be in a position allowing the locking means to be entered into the groove 41, and to be moved freely along the longitudinal axis of the groove, i.e. also to pass the engagement means 45 of the groove 41 easily. In this position the distance between the bottom 47 of the groove 41 and the locking surface 24 of the lower part 23 of the locking means 20, is smaller than the distance between the bottom 47 of the groove 41 and the surface of the engagement means 45 facing the bottom 47. It is also possible that the lower part of the locking means 23 will not be able to pass below the engagement means 45, but will be extending a smaller distance into the entering area 45. Then the mounting device 10 would not be able to be moved freely along the longitudinal axis of the groove 41.

Figures 8, 9:
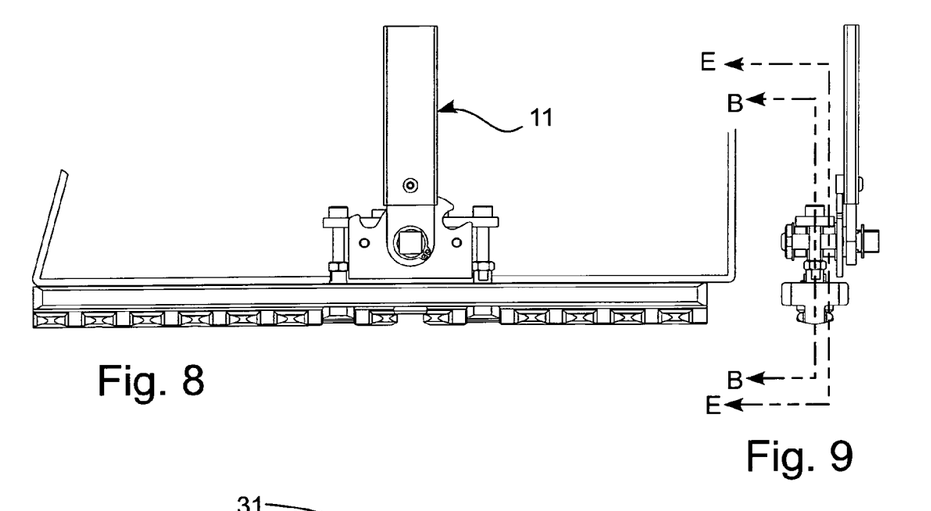
FIG. 8 illustrates the mounting device according to the invention in a second mode.
FIG. 9 illustrates a view of the mounting device of FIG. 8 rotated 90 degrees.

FIG. 8 illustrates the mounting device according to the invention in a second mode. In this second mode the handle 11 connected to the shaft 5 has been turned and the first cam 22 is in a position allowing the locking means 20 to be moved freely along the longitudinal axis of the groove, i.e. also to pass the engagement means 45 of the groove 41 easily. The surface of cam 32 is such that the positioning means 30 now may move in a downward direction controlled by the spring 35. Hence, in this mode the positioning means 30 will be pushed against the adjoining surfaces 42, 43 of the groove 41. When the mounting device 10 then is moved to a position where the positioning means 30 fits into the area 46 the positioning means 30 is pushed into this opening area 46 of the groove 41.

FIG. 9 illustrates the mounting device 10 in a 90 degree rotated view compared to FIG. 4. Two different sectional views are indicated in FIG. 9 and shown in FIGS. 10 and 11 in order to illustrate the position of the first and the second cam 22 and 32 in the second mode of operation. One view, E-E, pass through the first cam 22, and another view B-B pass through the second cam 32.

Figure 10:
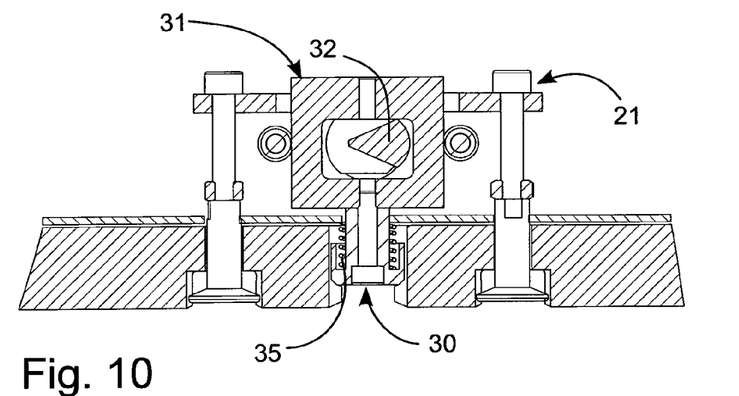
FIG. 10 illustrates the cross sectional view B-B of the mounting device in a second mode.

FIG. 10 illustrates the sectional view B-B, and the position of the second cam 32 is seen in the second mode of operation. The second cam 32 is no longer lifting the framework 31 as it did in the first mode of operation. Therefore, when the positioning means 30 is aligned with an area 46, the spring 35 will be able to push the positioning means 30 into the area 46 of the groove 41 into which the positioning means 30 fits.

Figure 11:
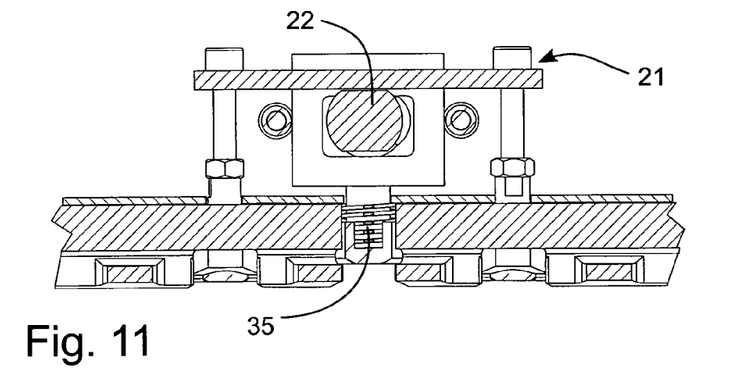
FIG. 11 illustrates the cross sectional view E-E of the mounting device in a second mode.

FIG. 11 illustrates the sectional view E-E, and the position of the first cam 22 is seen in the second mode of operation. The first cam 22 is positively not lifting the framework 21 and therefore the locking means 20 are freely moveable within the groove 41.

Means (not shown) will usually be provided preventing the handle 11 from being moved into a third mode (to be described below) before the positioning means have moved into the groove through an area 45.

Figures 12, 13:
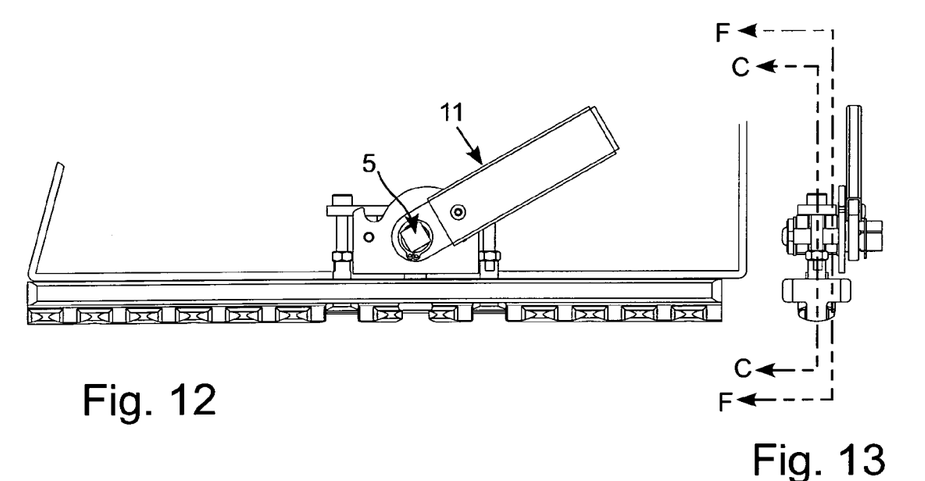
FIG. 12 illustrates the mounting device according to the invention in a third mode.
FIG. 13 illustrates a view of the mounting device of FIG. 12 rotated 90 degrees.

FIG. 12 illustrates a mounting device according to the invention in a third mode. In this third mode the first cam 22 is in a position pushing the framework 21 upwards. Thereby, the locking means 20 will be in engagement with the engagement means 45 of the groove, and the position of the mounting device will be fixed. In this mode the positioning means 30 will remain placed in the groove 41 through the area 46.

FIG. 13 illustrates the mounting device 10 in a 90 degree rotated view compared to FIG. 12. Two different sectional views are indicated in FIG. 13 and shown in FIGS. 14 and 15 in order to illustrate the position of the first and the second cam 22 and 32 in the third mode of operation. One view, F-F, pass through the first cam 22, and another view C-C pass through the second cam 32.

Figure 14:
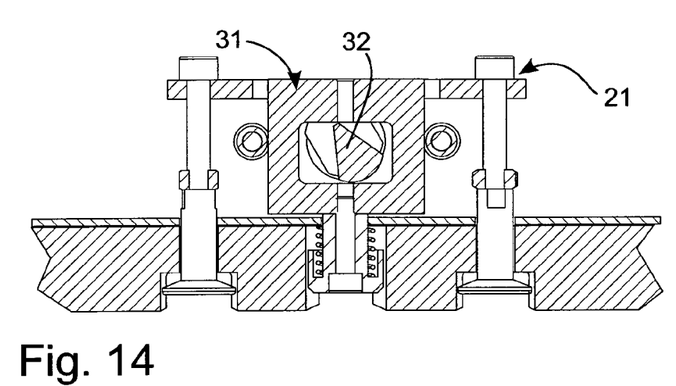
FIG. 14 illustrates the cross sectional view C-C of the mounting device in a third mode.

FIG. 14 illustrates the sectional view C-C, and the position of the second cam 32 is seen in the third mode of operation. The second cam 32 is not lifting the framework 31 and, therefore, the positioning means 30 remain in the groove 41 in the same area 46 through which it entered in the second mode of operation.

Figure 15:
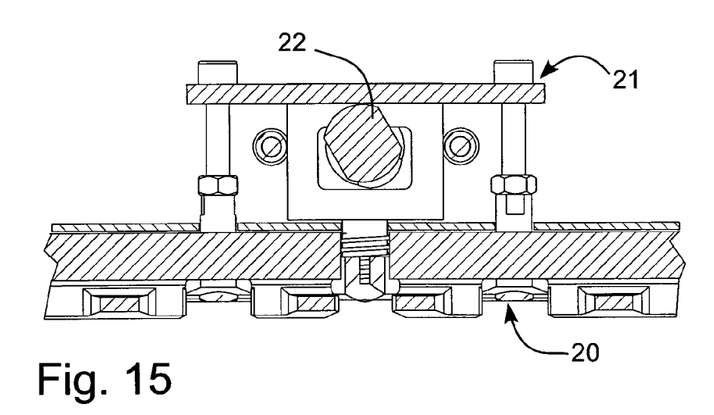
FIG. 15 illustrates the cross sectional view F-F of the mounting device in a third mode.

FIG. 15 illustrates the sectional view F-F, and the position of the first cam 22 is seen in the third mode of operation. The first cam 22 is now lifting the framework 21 and therefore the locking means 20 is tightened against the lower surface of the engagement means 45 of the groove 41. In this third mode of operation the distance X equals the distance Y. In the example of the invention illustrated in the drawings the first cam 22 is eccentrically placed on the shaft 5. Therefore, there will be a lifting force on the first framework 21 in the third mode of operation illustrated in FIG. 15. However, in the first mode of operation the locking means may be placed within the groove and be freely movable below the engagement means 45 if e.g. the first cam 22 is eccentrically placed on the shaft 5. In another example of the first mode as illustrated in FIG. 7, the second cam 22 is not eccentrically placed on the shaft 5. Therefore the lower part of the locking means 23 will not be able to pass below the engagement means 45, but will be extending a smaller distance into the entering area 45.

When the handle 11 is moved into the third mode of operation, means may be provided keeping the handle 11 in this mode. This may prevent accidental release of e.g. a chair in a vehicle. Such means could be a spring loaded tab 12 sliding on the top edge 14 of the mounting plate 13 (see FIG. 3). When the handle 11 is moved into the third mode, the tab 12 will engage with the opening 15 in the top edge 14 of the mounting plate 13. Thereafter, it is only possible to move the handle (e.g. back to the second mode) by lifting the tab 12 out of the opening 15. The tab 12 may be placed on an extendable part of the handle 11 which may be moved away from the shaft 5, thereby lifting the tab 12.

Figure 16:
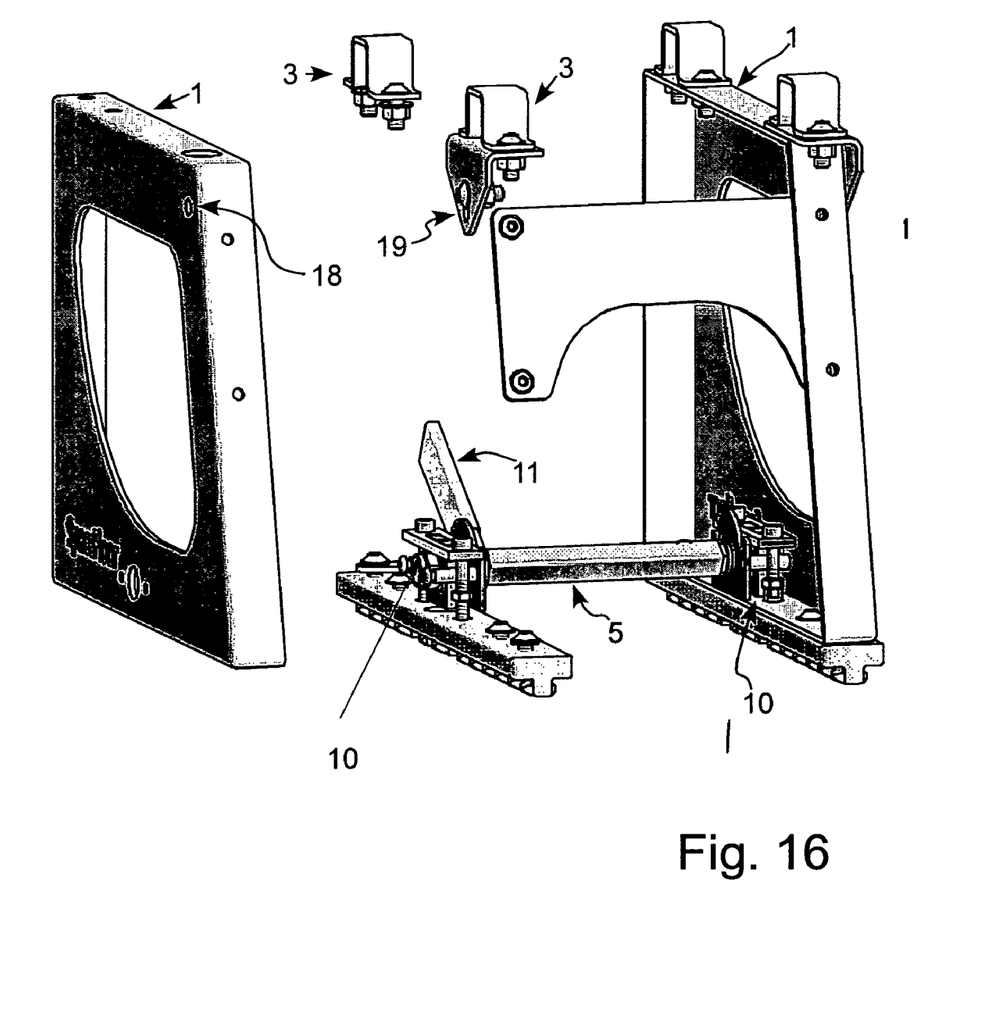
FIG. 16 illustrates a system for mounting furniture to the floor of a vehicle comprising two mounting devises.

In FIG. 16 a system for mounting e.g. a chair seat in a vehicle is illustrated. The system comprises two mounting devices 10 with one common shaft 5 for selecting the mode of operation for both mounting devices simultaneously. The rotation of the shaft is controlled by the one handle 11. Also two frames 1 each mounted to a supporting means 6 are illustrated.

FIG. 16 also illustrates a slot 18 in the frame 1. Such slots 18 in the frames 1 offer the possibility of adjusting the height of the seats during installation of the seats. This is advantageous for compensating for any misalignment in the floor or in the attachment of the mounting devices 10. This facilitates the possibility for, in a simple way, to bring every seat in a vehicle in level with the rest of the seats. It also offers the possibility of giving the seats the needed inclination. Also the fastening means 3 for securing the seat (not shown) to the frame 1 may be provided with a slot 19 for facilitating such adjustment or alignment.

The invention claimed is:

1. A mounting device (10) for fastening a chair or seat to a groove (41), said groove comprising engagement means (45), where the mounting device (10) comprises
    locking means (20) for entering the groove (41) and for being moved along the longitudinal axis of the groove (41); said locking means (20) having means (23) for engaging with the engagement means (45) of the groove (41);
    positioning means (30) for locating a position of the mounting device (10) where the locking means (20) will be able to engage with the engagement means (45) of the groove (41);
characterized in that the mounting device (10) comprises:
    a first cam (22) for controlling the engagement and disengagement of the locking means with said engagement means;
    a second cam (32), axially displaced from said first cam (22), for switching the positioning means (30) into an active position, where the positioning means (30) extend into the groove (41) in selected parts thereof;
    a shaft (5) for rotating both the first and the second cam (22, 32), said shaft (5) being, by a rotational movement, able to adjust the mounting device (10) between at least three modes:
    1) the positioning means (30) is passive and the locking means (20) are disengaged,
    2) the positioning means (30) is active and the locking means (20) are disengaged,
    3) the locking means (20) are engaged with the engagement means (45).

2. Mounting device (10) according to claim 1 comprising means for preventing rotation of the shaft into the third mode before the position means (30) in the second mode has found a position where the locking means (20) may engage with the engagement means (45) of the groove (41).

3. Mounting device (10) according to claim 1 wherein the one shaft (5) is substantially parallel with the plane formed by a surface comprising said groove (41).

4. Mounting device (10) according to claim 1 wherein the positioning means (30) extends into the groove (41) in areas (46) between the positions of engagement means (45) along the longitudinal direction of the groove (41).

5. Mounting device (10) according to claim 1 wherein the locking means (20) corresponds with a first framework (21) transferring the rotational movement of the first cam (22) to a movement of the locking means (20) substantially perpendicular to the surface (2) comprising said groove (41).

6. Mounting device (10) according to claim 1 wherein the positioning means (30) corresponds with a second framework (31) transferring the rotational movement of the second cam (32) to a movement of the positioning means (30) substantially perpendicular to the surface (2) comprising said groove (41).

7. Mounting device (10) according to claim 6 wherein said second framework (31) is placed to move through an opening in said first framework (21).

8. Mounting device (10) according to claim 1 wherein the areas (46) along the longitudinal direction of the groove are formed by parts of circle peripheries, situated symmetrically opposite one another on both sides (42, 43) of the groove (41).

9. Mounting device (10) according to claim 8 wherein engagement means (45) are formed at locations where two parts of said circle peripheries are opposite to one another.

10. Mounting device (10) according to claim 8 wherein the two parts of circle peripheries situated symmetrically opposite one another, form part of the periphery of substantially the same circle.

11. Mounting device (10) according to claim 1 wherein the shaft (5) is dimensioned to operate more than one mounting device (10) simultaneously.

12. Mounting device (10) according to claim 1 wherein the mounting device (10) is connected to a frame, and wherein a further mounting device is connected to said frame, and the shaft (5) is arranged to operate both said mounting devices (10) simultaneously.

13. Mounting device (10) according to claim 1 wherein the mounting device (10) is designed to be placed directly on the bottom surface (47) of the groove (41).

14. A seat for mounting to the floor of a vehicle by means of the mounting device (10) according to claim 1.

15. A system for mounting furniture to the floor of a vehicle comprising two mounting devices (10) according to claim 1 wherein the mounting devices (10) are operated by one common shaft (5).

16. A method for mounting a mounting device (10) according to claim 1 wherein the mounting device (10) is secured in a groove (41) with engagement means (45), comprising the steps of:

entering locking means (20) of the device into groove (41);

activating positioning means (30) by a handle (11) such that a force will act on the positioning means (30) in order to push it into the groove (41) when the geometry of the positioning means (30) fits the geometry of the groove (41);

when the mounting device (10) is in a position where the locking means (20) will be able to engage with the engagement means (45) of the groove (41), the handle (11) is set in a position pressing the locking means (20) against the engagement means (45)

characterized in that the handle (11) is able to shift between the three modes of operation by rotating a shaft (5) to position a first cam (22) controlling the position of the locking means (20) and simultaneously to position a second cam (32) controlling the position of the positioning means (30).

* * * * *